United States Patent
Lee

(10) Patent No.: US 7,200,764 B2
(45) Date of Patent: Apr. 3, 2007

(54) CURRENT LIMITING DEVICE AND A PDA UTILIZING THE CURRENT LIMITING DEVICE

(75) Inventor: Chien-Ju Lee, Yunlin County (TW)

(73) Assignee: Inventec Appliances Corporation, Taipei Hsieng (TW)

( * ) Notice: Subject to any disclaimer, the term of this patent is extended or adjusted under 35 U.S.C. 154(b) by 483 days.

(21) Appl. No.: 10/734,182

(22) Filed: Dec. 15, 2003

(65) Prior Publication Data

US 2005/0132108 A1 Jun. 16, 2005

(51) Int. Cl.
*G06F 1/32* (2006.01)
*G06F 1/26* (2006.01)

(52) U.S. Cl. .................. 713/320; 713/300

(58) Field of Classification Search ............... None
See application file for complete search history.

(56) References Cited

U.S. PATENT DOCUMENTS 6,477,605 B1 * 11/2002 Taki et al. ............ 713/310
6,594,768 B1 * 7/2003 Ono et al. ............ 713/300
6,697,953 B1 * 2/2004 Collins ................. 713/320
6,763,478 B1 * 7/2004 Bui ....................... 713/600

* cited by examiner

*Primary Examiner*—Lynne H. Browne
*Assistant Examiner*—Anand B. Patel
(74) *Attorney, Agent, or Firm*—Birch, Stewart, Kolasch & Birch, LLP

(57) ABSTRACT

A present invention provides a PDA with a built-in current limiting device. When powered by a battery, the PDA outputs a current to an external device, wherein the current is within a first current range. When powered by external power through an adapter, the PDA outputs the current to the external device, wherein the current is within a second current range. The first current range is smaller than the second current range. Additionally, a current limiting device built into a PDA is disclosed.

16 Claims, 3 Drawing Sheets

CURRENT LIMITING DEVICE AND A PDA UTILIZING THE CURRENT LIMITING DEVICE

BACKGROUND OF THE INVENTION

1. Field of the Invention

The present invention relates to a current limiting device, and in particular relates to a current limiting device for limiting an output current range of a PDA (personal digital assistant). The current limiting device can be integrated in the PDA, thus reducing power consumption.

2. Description of the Related Art

Conventionally PDAs have not been used as hosts. As technology advances, PDAs have become more powerful and can be used as hosts.

PDAs however cannot supply enough power to external devices due to the capacity limitation of the battery, thus PDAs often fail, hence output current is critical when the PDA is used as a host.

SUMMARY OF THE INVENTION

The object of the present invention is to provide a PDA. When powered by a battery, the PDA outputs a current to an external device, wherein the current is within a first current range. When powered by external power through an adapter, the PDA outputs current to the external device, wherein the current is within a second current range.

The PDA outputs a current within a first current range to an external device when supplied with battery power and outputs a current within a second current range to the external device when supplied with external power through an adapter. The PDA comprises, a main device, a switching device and a current limiting device. The main device performs PDA data processing functions. The main device enables a control signal when the PDA receives external power through the adapter. The switch device has a first input terminal, a second input terminal, a control terminal and an output terminal. The first input terminal receives battery power. The second input terminal receives external power. The control terminal receives the control signal. The output terminal outputs battery power when the control signal is disabled and outputs external power when the control signal is enabled. The current limiting device is coupled to the output terminal of the switch device, wherein the current limiting device outputs the current within the first current range to the external device when the switch device outputs battery power and outputs the current within the second current range to the external device when the switch device outputs external power.

Additionally the present invention provides a PDA with built-in current limiting. The PDA is used as a host and is connected to an external device, wherein the current limiting device outputs a current within a first current range to the external device when the PDA is supplied with battery power, and wherein the PDA enables a control signal and the current limiting device outputs a current within a second current range to the external device when the PDA is supplied with external power through an adapter.

The current limiting device comprises, a switch device, a current limiting device, a first resistor, a second resistor and a selecting device. The switch device has a first input terminal, a second input terminal, a control terminal and an output terminal. The first input terminal receives battery power. The second input terminal receives external power. The control terminal receives the control signal. The output terminal outputs battery power when the control signal is disabled and outputs external power when the control signal is enabled. The current limiting module is coupled to the output terminal of the switching device. The first resistor is coupled between the current limiting module and a voltage level (Gnd), to provide a first impedance. The second resistor provides a second impedance. The selecting device is serially connected to the second resistor, wherein both the selecting device and the second resistor are coupled between the current limiting device and the voltage level (Gnd), wherein the selecting device is turned off and the limiting module receives only the first impedance when the control signal is disabled, and wherein the selecting device is turned on and the limiting module receives the first and the second impedances when the control signal is enabled.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawings, which are given by way of illustration only, and thus are not limitative of the present invention, and wherein.

DETAILED DESCRIPTION OF THE INVENTION

Figure 1:
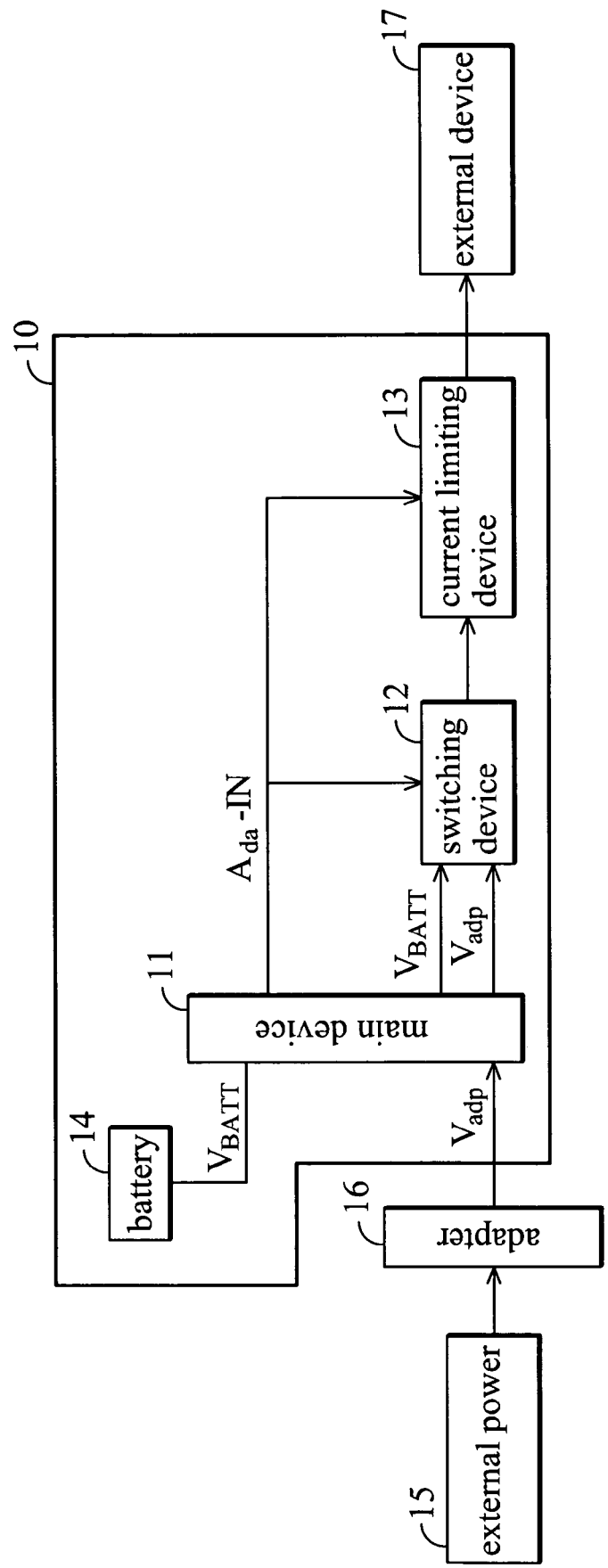
FIG. 1 is a PDA with a built-in current limiting device.

FIG. 1 is a PDA with a built-in current limiting device. The PDA 10 outputs a current within a first current range to an external device 17 when supplied with a battery power $V_{BATT}$ and outputs a current within a second current range to the external device 17 when supplied with external power $V_{adp}$ through an adapter 15.

The PDA 10 comprises, a battery 14, a main device 11, a switching device 12, and a current limiting device 13. The battery 14 supplies battery power $V_{BATT}$.

The main device 11 performs necessary data processing. The main device 11 enables a control signal $A_{da}$-IN when supplied with external power $V_{adp}$ through the adapter 16. The switch device 12 comprises, a first input terminal, a second input terminal, a control terminal and an output terminal. The first input terminal receives battery power $V_{BATT}$. The second input terminal receives external power $V_{adp}$. The control terminal receives the control signal $A_{da}$-IN. The output terminal outputs battery power $V_{BATT}$ when the control signal $A_{da}$-IN is disabled and outputs external power $V_{adp}$ when the control signal $A_{da}$-IN is enabled.

The current limiting device 13 is coupled to the output terminal of the switch device 12, wherein the current limiting device 13 outputs the current within the first current range to the external device 17 when the switch device 12 outputs battery power $V_{BATT}$, and outputs the current within the second current range to the external device 17 when the switch device 12 outputs external power $V_{adp}$.

Figure 2:
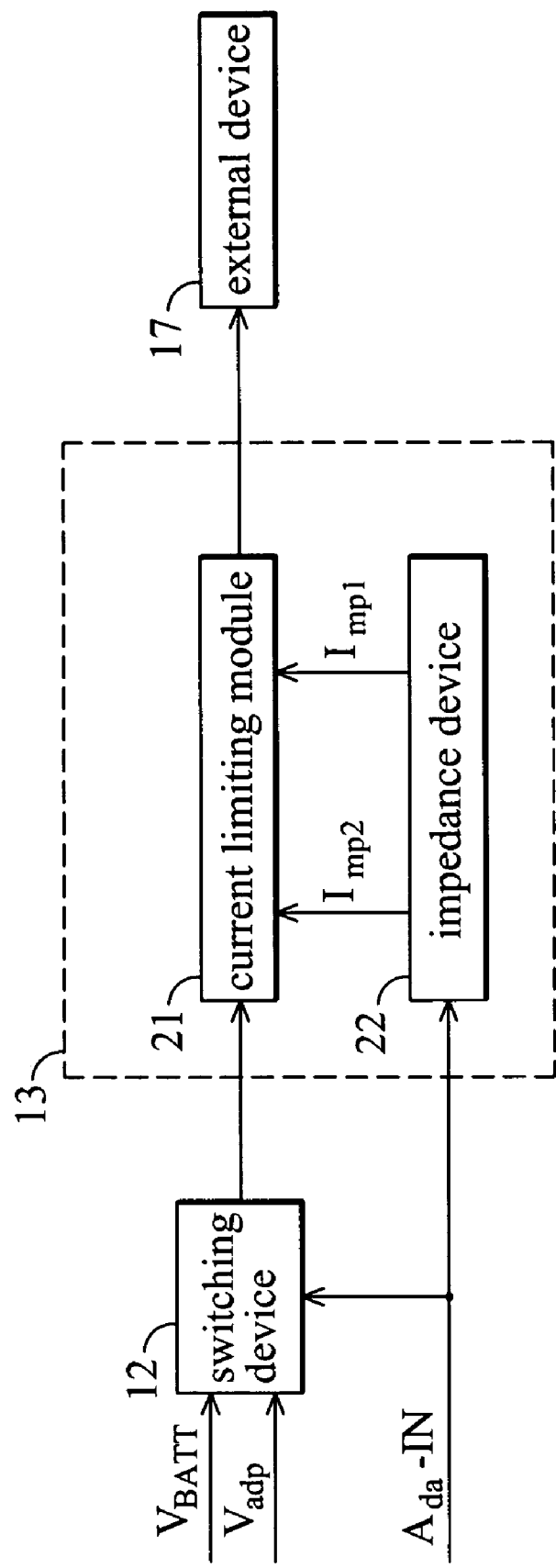
FIG. 2 is a block diagram of the current limiting device.

FIG. 2 is a block diagram of the current limiting device. The current limiting device 13 comprises a current limiting module 21 and an impedance device 22.

The impedance device 22 provides a first impedance $I_{mp1}$ and a second impedance $I_{mp2}$, wherein the impedance device 22 outputs the first impedance $I_{mp1}$ when the control signal $A_{da}$-IN is disabled and outputs the first impedance $I_{mp1}$ and the second impedance $I_{mp2}$ when the control signal $A_{da}$-IN is enabled.

The current limiting module 21 is coupled to the output terminal of the switching device 12, wherein the current limiting module 21 outputs the current within the first current range when receiving the first impedance $I_{mp1}$ and outputs the current within the second current range when receiving the first impedance $I_{mp1}$ and the second impedance $I_{mp2}$.

Figure 3:
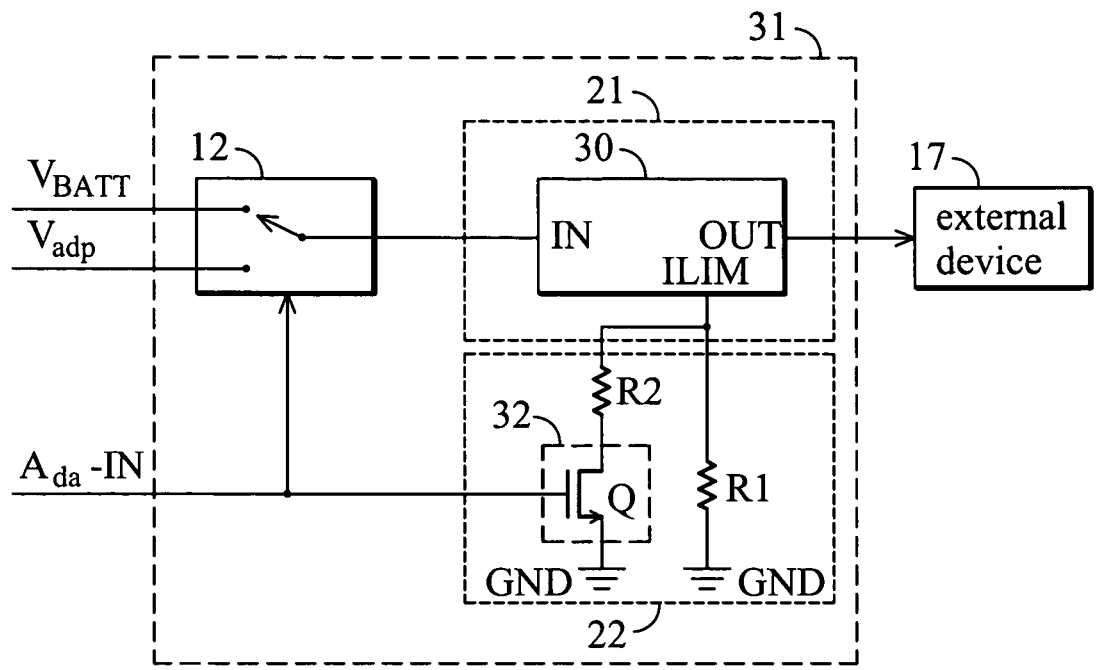
FIG. 3 is a schematic diagram showing the circuit of the current limiting device.

FIG. 3 is a schematic diagram showing the circuit of the current limiting device. A current limiting device 31 is built into a PDA, wherein the PDA is used as a host and is connected to an external device 17, wherein the current limiting device 31 outputs a current within a first current range to the external device 17 when the PDA is supplied with a battery power $V_{BATT}$, and wherein the PDA enables a control signal $A_{da}$-IN and the current limiting device 31 outputs a current within a second current range to the external device 17 when the PDA is supplied with external power $V_{adp}$ through an adapter. The first current range is smaller than the second current range.

The current limiting device 31 comprises a switching device 12, a current limiting module 21, a first resistor R1, a second resistor R2, and a selecting device 32.

The switch device 12 comprises a first input terminal, a second input terminal, a control terminal and an output terminal. The first input terminal receives battery power $V_{BATT}$. The second input terminal receives external power $V_{adp}$. The control terminal receives the control signal $A_{da}$-IN. The output terminal outputs battery power $V_{BATT}$ when the control signal $A_{da}$-IN is disabled and outputs external power $V_{adp}$ when the control signal $A_{da}$-IN is enabled.

The current limiting module 21 is coupled to the output terminal of the switching device 12.

The first resistor R1 is coupled between the current limiting module 21 and a voltage level (Gnd), to provide a first impedance $I_{mp1}$. The second resistor R2 provides a second impedance $I_{mp2}$.

The selecting device 32 is serially connected to the second resistor R2, wherein both the selecting device 32 and the second resistor R2 are coupled between the current limiting device 21 and the voltage level (Gnd), wherein the selecting device 32 is turned off and the limiting module 21 receives only the first impedance $I_{mp1}$ when the control signal $A_{da}$-IN is disabled, and wherein the selecting device 32 is turned on and the limiting module 21 receives the first impedance Imp, and the second impedance $I_{mp2}$ when the control signal $A_{da}$-IN is enabled.

In this embodiment, the selecting device 32 is a N-type transistor having a gate receiving the control signal $A_{da}$-IN, a drain coupled to the second resistor R2, and a source coupled to the voltage level (Gnd).

The current limiting module 21 of the present invention is a current limiting integrated circuit (IC) 30 MIC2544 or MIC2548. A fourth pin of the current limiting integrated circuit 30 receives an impedance, and a maximum value of an output current ($I_{Limit}$) of the current limiting integrated circuit 30 is limited by the impedance ($R_{SET}$) provided by the impedance device 22 in accordance with the formula $$I_{Limit} = \frac{230\ V}{R_{SET}}.$$

Figure 4:
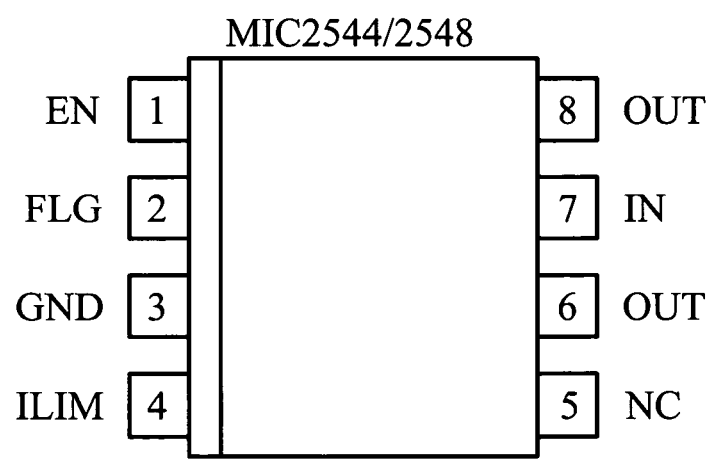
FIG. 4 is a schematic diagram showing the pin definitions of the current limiting device.

FIG. 4 is a schematic diagram showing the pin definitions of the current limiting device. The fourth pin receives impedance and outputs a current according to the impedance.

Moreover, in the present embodiment, the external device 17 is a printer or a digital camera. The PDA and the external device are connected by a cable.

Advantages of the present invention are described in the following. The present invention detects the type of power supplied to the PDA. The PDA outputs a current within a first current range to an external device when supplied with battery power and outputs a current within a second current range to the external device when supplied with external power through an adapter. The first current range is smaller than the second current range. Finally, the PDA is used as a host and is connected to an external device.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A Personal Digital Assistant, wherein the Personal Digital Assistant outputs a current within a first current range to an external device when supplied with a battery power and outputs a current within a second current range to the external device when supplied with external power through an adapter, comprising:

a main device, for performing necessary data processing, enabling a control signal when supplied with external power through the adapter;

a switch device comprising a first input terminal receiving battery power, a second input terminal receiving external power, a control terminal receiving the control signal, and an output terminal outputs battery power when the control signal is disabled and outputs external power when the control signal is enabled; and a current limiting device comprising:

an impedance device for providing a first impedance and a second impedance, wherein the impedance device outputs the first impedance when the control signal is disabled and outputs the first and the second impedances when the control signal is enabled; and a current limiting module coupled to the output terminal of the switching device, wherein the current limiting module outputs the current within the first current range when receiving the first impedance and outputs the current within the second current range when receiving the first and the second impedances.

2. The Personal Digital Assistant as claimed in claim 1, wherein the external device is a printer.

3. The as claimed in claim 1, wherein the external device is a digital camera.

4. The Personal Digital Assistant as claimed in claim 1, wherein the current limiting module is a current limiting integrated circuit MIC2544 or MIC2548.

5. The Personal Digital Assistant as claimed in claim 4, wherein a fourth pin of the current limiting integrated circuit is coupled to the impedance and wherein a maximum value of an output current ($I_{Limit}$) of the current limiting integrated circuit is limited by the impedance ($R_{SET}$) provided by the impedance device in accordance with the formula $$I_{Limit} = \frac{230\ V}{R_{SET}}.$$

6. The Personal Digital Assistant as claimed in claim 1, the Personal Digital Assistant and the external device are connected by a cable.

7. The Personal Digital Assistant as claimed in claim 1, wherein the first current range is smaller than the second current range.

8. The Personal Digital Assistant as claimed in claim 1, wherein the impedance device comprises:
   a first resistor, coupled between the current limiting module and a voltage level (Ground), for providing the first impedance;
   a second resistor for providing the second impedance; and
   a selecting device serially connected to the second resistor, wherein both the selecting device and the second resistor are coupled between the current limiting device and the voltage level (Ground), wherein the selecting device is turned off and the limiting module receives only the first impedance when the control signal is disabled, and wherein the selecting device is turned on and the limiting module receives the first and the second impedances when the control signal is enabled.

9. The Personal Digital Assistant as claimed in claim 8, wherein the selecting device is an N-type transistor having a gate receiving the control signal, a drain coupled to the second resistor, and a source coupled to the voltage level (Ground).

10. The Personal Digital Assistant as claimed in claim 8, wherein the selecting device is a P-type transistor having a gate receiving the control signal, a drain coupled to the voltage level (Ground), and a source coupled to the second resistor.

11. A current limiting device built into a Personal Digital Assistant, wherein the Personal Digital Assistant is used as a host and is connected to an external device, wherein the current limiting device outputs a current within a first current range to the external device when the Personal Digital Assistant is supplied with battery power, and wherein the Personal Digital Assistant enables a control signal and the current limiting device outputs a current within a second current range to the external device when the Personal Digital Assistant is supplied with external power through an adapter, comprising:
   a switch device comprising a first input terminal receives battery power, a second input terminal receives external power, a control terminal receives the control signal, and an output terminal outputs battery power when the control signal is disabled and outputs external power when the control signal is enabled;
   a current limiting module coupled to the output terminal of the switching device;
   a first resistor, coupled between the current limiting module and a voltage level (Ground), to provide a first impedance;
   a second resistor for providing a second impedance; and
   a selecting device serially connected with the second resistor, wherein both the selecting device and the second resistor are coupled between the current limiting device and the voltage level (Ground), wherein the selecting device is turned off and the limiting module receives only the first impedance when the control signal is disabled, and wherein the selecting device is turned on and the limiting module receives the first and the second impedances when the control signal is enabled.

12. The current limiting device as claimed in claim 11, wherein the current limiting module is a current limiting integrated circuit MIC2544 or MIC2548.

13. The current limiting device as claimed in claim 12, wherein a fourth pin of the current limiting integrated circuit is coupled to the impedance and wherein a maximum value of an output current ($I_{Limit}$) of the current limiting integrated circuit is limited by the impedance ($R_{SET}$) provided by the impedance device in accordance with a relationship formula $$I_{Limit} = \frac{230\ V}{R_{SET}}.$$

14. The current limiting device as claimed in claim 11, wherein the first current range is smaller than the second current range.

15. The current limiting device as claimed in claim 11, wherein the selecting device is an N-type transistor having a gate receiving the control signal, a drain coupled to the second resistor, and a source coupled to the voltage level (Ground).

16. The current limiting device as claimed in claim 11, wherein the selecting device is a P-type transistor having a gate receiving the control signal, a drain coupled to the voltage level (Ground), and a source coupled to the second resistor.

* * * * *